US012697709B1

(12) United States Patent
Su

(10) Patent No.: US 12,697,709 B1
(45) Date of Patent: Aug. 4, 2026

(54) TOOL KIT STRUCTURE

(71) Applicant: Yen-Ming Su, Taichung City (TW)

(72) Inventor: Yen-Ming Su, Taichung City (TW)

( * ) Notice: Subject to any disclaimer, the term of this patent is extended or adjusted under 35 U.S.C. 154(b) by 0 days.

(21) Appl. No.: 19/079,710

(22) Filed: Mar. 14, 2025

(51) Int. Cl.
*B25H 3/00* (2006.01)

(52) U.S. Cl.
CPC .................................... *B25H 3/003* (2013.01)

(58) Field of Classification Search
CPC ...................................................... B25H 3/003
USPC ................ 206/379, 373, 372, 349, 374, 234
See application file for complete search history.

(56) References Cited

U.S. PATENT DOCUMENTS

2006/0016706 A1* 1/2006 Chen ...................... B25H 3/003
206/379
2012/0043238 A1* 2/2012 Christopher ........... B25H 3/003
206/375

FOREIGN PATENT DOCUMENTS

DE 102009035306 A1 * 2/2011 ............. B25H 3/003
EP 2361733 B1 2/2016
TW 1907268 B * 12/2025 ............... B25H 3/00

* cited by examiner

*Primary Examiner* — Mollie Impink
(74) *Attorney, Agent, or Firm* — LANWAY IPR SERVICES; Chun-Ming Shih

(57) ABSTRACT

A tool kit structure includes a first body, a second body, a third body, and a fourth body. The first body is provided with a first receiving recess, a second receiving recess, two second pivot portions, multiple third receiving recesses, a fourth receiving recess, at least one first hollow slot, a fifth receiving recess, and a second hollow slot. The second body is mounted in the first receiving recess. The third body is assembled in the second receiving recess. The third body is provided with multiple mounting portions. The fourth body is pivotally connected with the first body to cover the first body or extend from the first body. The fourth body is provided with a sixth receiving recess aligning with the fifth receiving recess. The sixth receiving recess is provided with a third hollow slot, a fourth hollow slot, and a fifth hollow slot.

9 Claims, 15 Drawing Sheets

TOOL KIT STRUCTURE

BACKGROUND OF THE INVENTION

Field of the Invention

The present invention relates to a storage device and, more particularly, to a tool kit structure or tool set structure or tool assembly.

Description of the Related Art

A conventional tool storage device was disclosed in the European Patent No. EP2361733B1, and comprises a tool box (or frame part) 1, a slide (or retaining element) 16, and multiple tools. The tool box 1 is provided with a slide guide (or guide groove) 18 and a hollow slot. The slide 16 is slidably mounted in the slide guide 18. The slide 16 slides in the slide guide 18 leftward or rightward to limit a ratchet 11 in a receiving chamber, to prevent the ratchet 11 from being detached from the receiving chamber. The ratchet 11 may be removed from the receiving chamber. The tools are received in a receiving space of the tool box 1.

However, the conventional tool storage device has the following disadvantages.

1. The tool box 1 is provided with only one hollow slot to allow the user watching the interior of the tool box 1. When the user wishes to take the required tools of a specific size or specification, he/she must unfold or open the tool box 1 to search for the required tools, thereby greatly causing inconvenience to the user.
2. The slide 16 slides in the slide guide 18 leftward or rightward to limit the ratchet 11 in the receiving chamber, or to remove the ratchet 11 from the receiving chamber. But the slide 16 only covers the shank of the ratchet 11 whose working end is exposed from the tool box 1. Thus, the working end of the ratchet 11 is easily damaged due to hit.
3. The slide 16 is positioned in the slide guide 18 by a protrusion formed on the slide guide 18. But the slide 16 easily slips from the protrusion of the slide guide 18, so that the slide 16 cannot be positioned in the slide guide 18 exactly.

BRIEF SUMMARY OF THE INVENTION

The primary objective of the present invention is to provide a tool kit structure having multiple hollow slots, to facilitate the user watching the interior of the tool kit structure, and to facilitate the user taking the required tools.

In accordance with the present invention, there is provided a tool kit structure comprising a first body, a second body, a third body, and a fourth body. The first body is provided with a first receiving recess, two first pivot portions, a second receiving recess, two second pivot portions, multiple third receiving recesses, a fourth receiving recess, at least one first hollow slot, a fifth receiving recess, and a second hollow slot. The second body is mounted in the first receiving recess. The third body is assembled in the second receiving recess. The third body is provided with multiple mounting portions. The fourth body is provided with two fourth pivot portions pivotally connected with the two first pivot portions, so that the fourth body is pivotally connected with the first body. The fourth body covers the first body or extends from the first body. The fourth body is provided with a sixth receiving recess aligning with the fifth receiving recess. The sixth receiving recess is provided with a third hollow slot, a fourth hollow slot, and a fifth hollow slot.

According to the primary advantage of the present invention, when the fourth body covers the first body, it can be seen from the at least one first hollow slot that the second tools are received in the fourth receiving recess, it can be seen from the second hollow slot and the third hollow slot that the fifth tool is received in the fifth receiving recess and the sixth receiving recess, it can be seen from the fourth hollow slot that the third tools are received in the first receiving recess, and two of the second tools are received in the fourth receiving recess, and it can be seen from the fifth hollow slot that the fourth tools are received in the mounting portions respectively, and the first tools are received in the third receiving recesses respectively. Thus, the tool kit structure is provided with the at least one first hollow slot, the second hollow slot, the third hollow slot, the fourth hollow slot, and the fifth hollow slot, to facilitate the user viewing and checking the inside of the tool kit structure, and to facilitate the user taking the tools.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
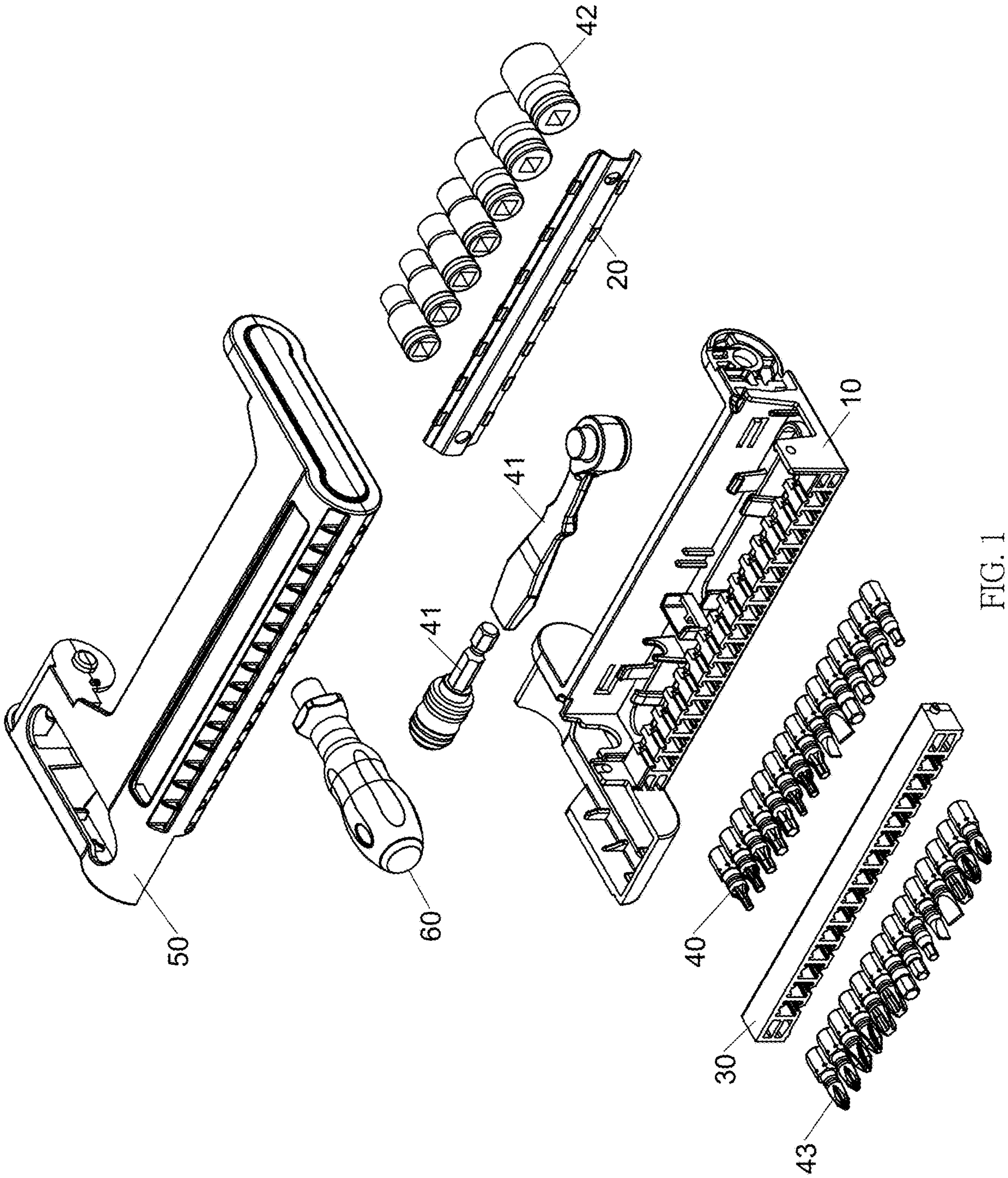
FIG. 1 is an exploded perspective view of a tool kit structure in accordance with the preferred embodiment of the present invention.
Figure 2:
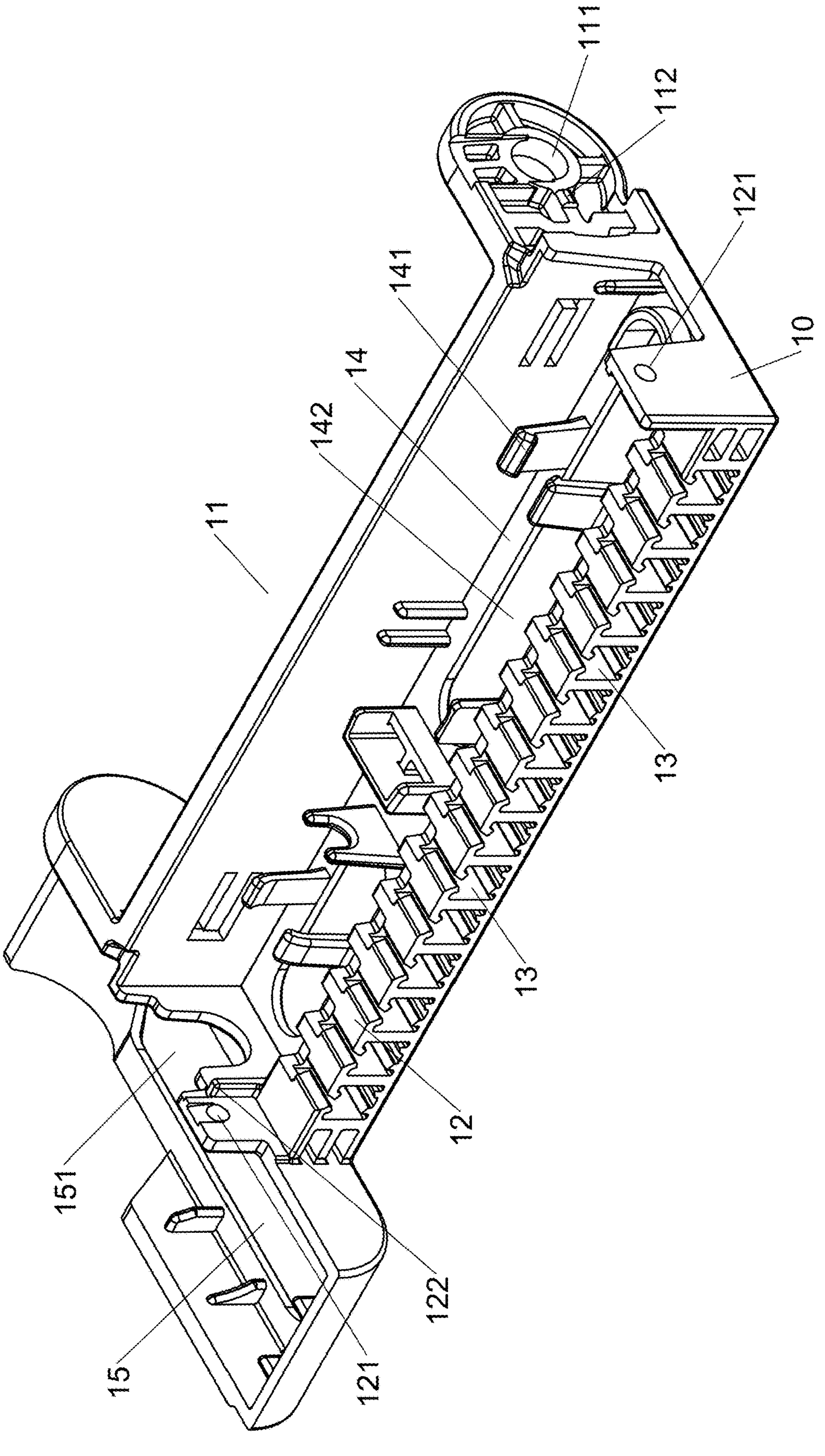
FIG. 2 is a perspective view of a first body of the tool kit structure in accordance with preferred embodiment of the present invention.
Figure 3:
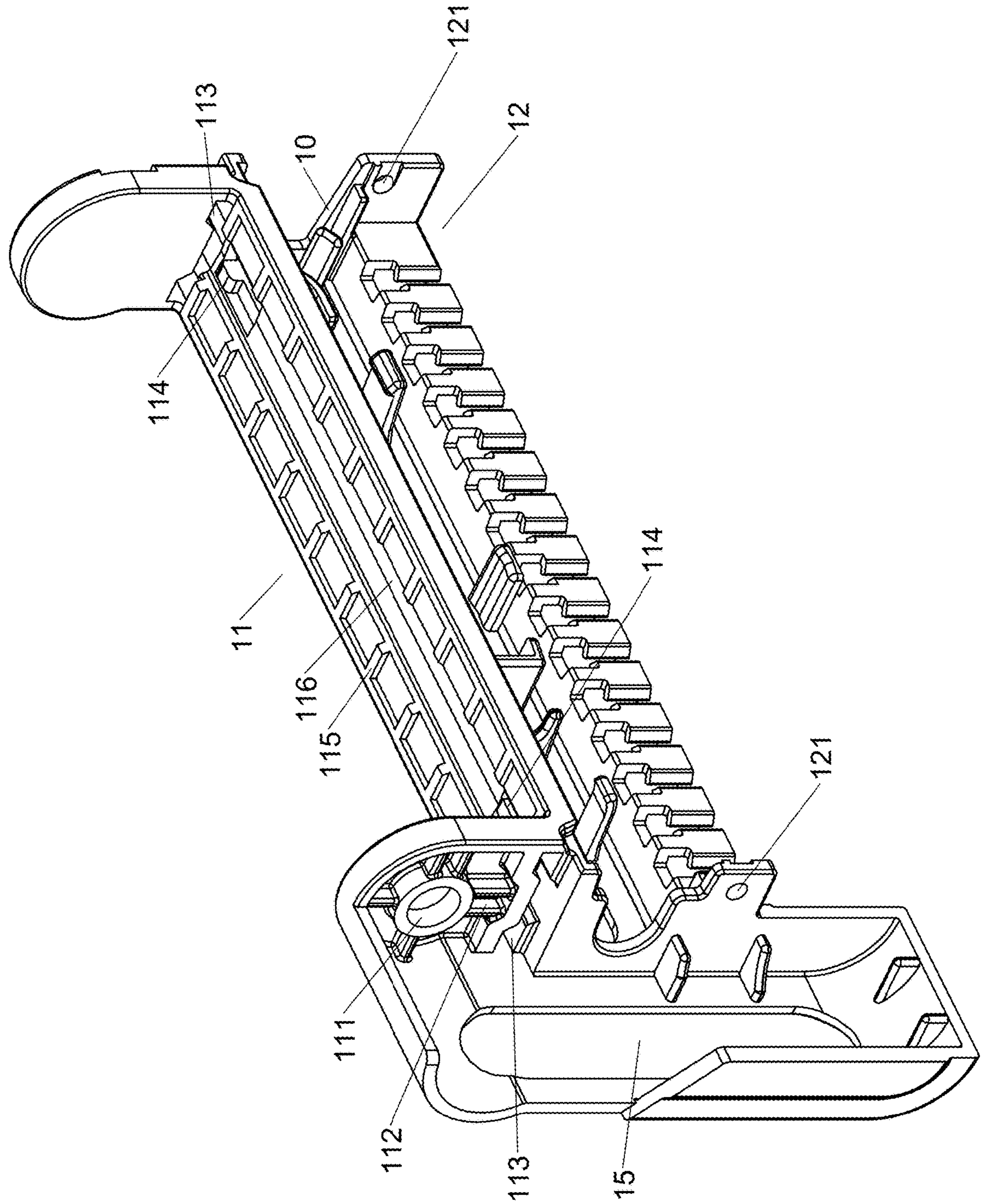
FIG. 3 is another perspective view of the first body of the tool kit structure in accordance with preferred embodiment of the present invention.
Figure 4:
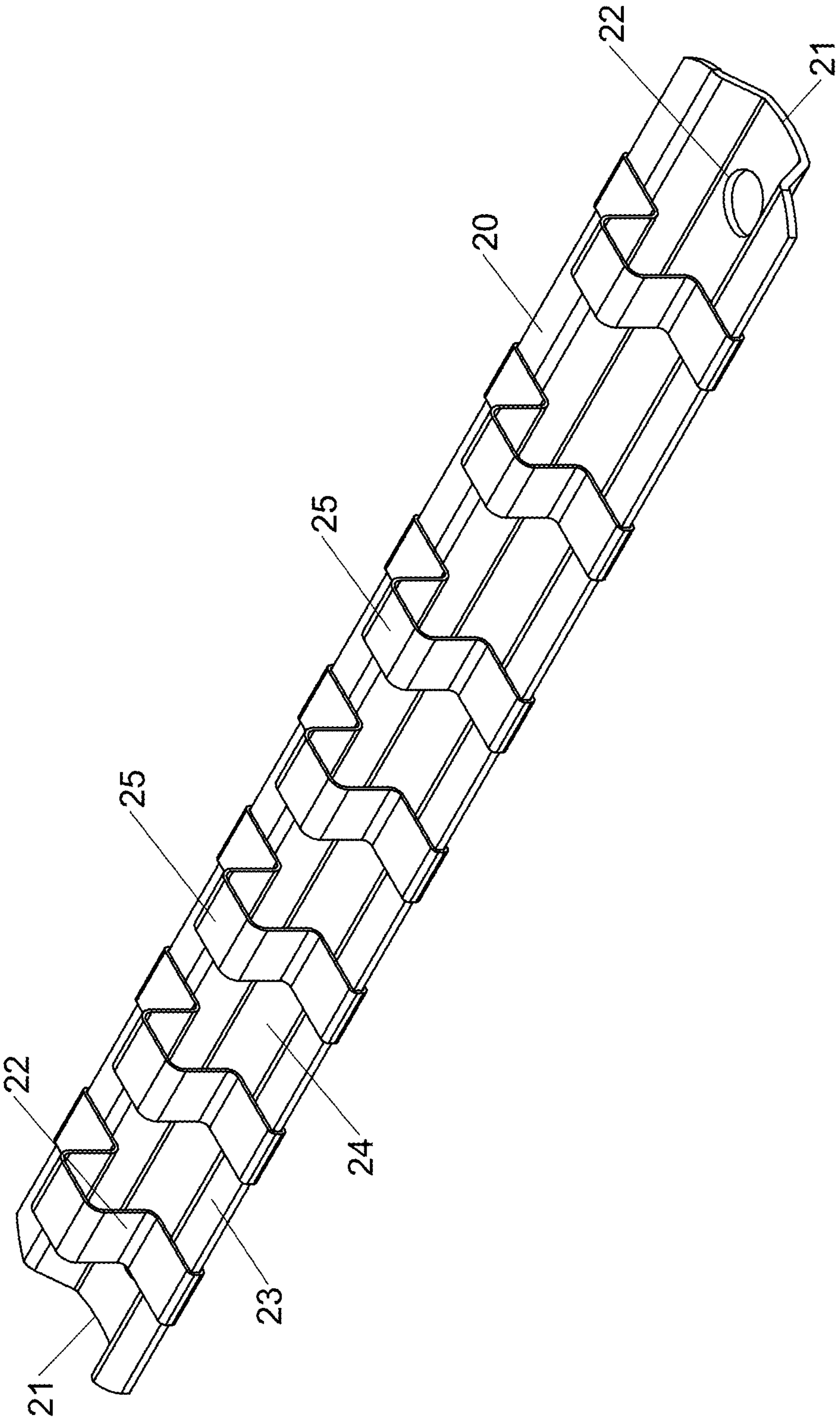
FIG. 4 is a perspective view of a second body of the tool kit structure in accordance with preferred embodiment of the present invention.

Referring to the drawings and initially to FIGS. 1-12, a tool kit structure in accordance with the preferred embodiment of the present invention comprises a first body 10, a second body 20, a third body 30, multiple first tools 40, multiple second tools 41, multiple third tools 42, multiple fourth tools 43, a fourth body 50, and a fifth tool 60.

The first body 10 is provided with a first receiving recess 11 having two open sides. The first receiving recess 11 has two first pivot portions 111 formed on two ends thereof. Each of the two first pivot portions 111 is a non-penetrating circular hole. Each of the two first pivot portions 111 is provided with a first locking section 112. Preferably, the first locking section 112 of one of the two first pivot portions 111 is a projection, and the first locking section 112 of the other one of the two first pivot portions 111 is a cavity. The first receiving recess 11 has two first grooves 113 formed in the two ends thereof. Each of the two first grooves 113 is provided at each of the two first pivot portions 111 and the first locking section 112. The first receiving recess 11 is provided with two second locking sections 114. Each of the two second locking sections 114 is an elastic projection or bump. Each of the two second locking sections 114 is slightly elastic and may be pressed downward. The two second locking sections 114 are located at the two ends of the first receiving recess 11. The two second locking sections 114 are close to the two first grooves 113 respectively. The first receiving recess 11 is provided with a first face 115 having a middle position provided with a second face 116. The second face 116 divides the first face 115 into two parts. The second face 116 and the first face 115 are different planes. The second face 116 is a concave surface relative to the first face 115. The second face 116 has a height less than that of the first face 115. The two second locking sections 114 are located on the second face 116.

The first body 10 is provided with a second receiving recess 12 opposite to the first receiving recess 11. The second receiving recess 12 has two second pivot portions 121 formed on two ends thereof. Each of the two second pivot portions 121 is a circular hole or groove. Each of the two second pivot portions 121 has a side provided with a first abutting portion 122. The first abutting portion 122 is a lug or flange.

The first body 10 is provided with multiple third receiving recesses 13 located at a side of the second receiving recess 12. The third receiving recesses 13 are arranged linearly. Each of the third receiving recesses 13 is a groove.

The first body 10 is provided with a fourth receiving recess 14 located between the first receiving recess 11 and the second receiving recess 12. The fourth receiving recess 14 is provided with multiple third locking sections 141. Each of the third locking sections 141 includes two clamping blocks. The fourth receiving recess 14 is provided with at least one first hollow slot 142. The at least one first hollow slot 142 is located between the two clamping blocks of each of the third locking sections 141 and has an elongate shape.

The first body 10 has an end provided with a fifth receiving recess 15 located at an end of the first receiving recess 11, the second receiving recess 12, and the fourth receiving recess 14. The fifth receiving recess 15 is provided with a second hollow slot 151.

The second body 20 is a sheet plate. The second body 20 is mounted in the first receiving recess 11. The second body 20 has two receiving portions 21 formed on two ends thereof. The two receiving portions 21 correspond to the two first grooves 113 respectively. The second body 20 is provided with two fourth locking sections 22 locked on the two second locking sections 114 respectively. The two fourth locking sections 22 are close to the two receiving portions 21 respectively. Each of the two fourth locking sections 22 is a through hole. The second body 20 is provided with a third face 23 and a fourth face 24. The third face 23 and the fourth face 24 are different planes. The third face 23 is flush (or level) with or rests on the first face 115. The fourth face 24 is flush (or level) with or rests on the second face 116. The second body 20 is provided with multiple fifth locking sections 25. Each of the fifth locking sections 25 is an inverted U-shaped metal elastic plate. Each of the fifth locking sections 25 has two ends abutting the third face 23. Each of the fifth locking sections 25 aligns with the fourth face 24. The fifth locking sections 25 are arranged linearly.

Thus, the two receiving portions 21 are received in the two first grooves 113 respectively, and the two fourth locking sections 22 are locked on the two second locking sections 114 respectively, so that the second body 20 is non-movable in the first receiving recess 11 leftward or rightward. In addition, the third face 23 is flush with or rests on the first face 115, and the fourth face 24 is flush with or rests on the second face 116, so that the second body 20 is non-movable in the first receiving recess 11 forward or backward.

Figure 5:
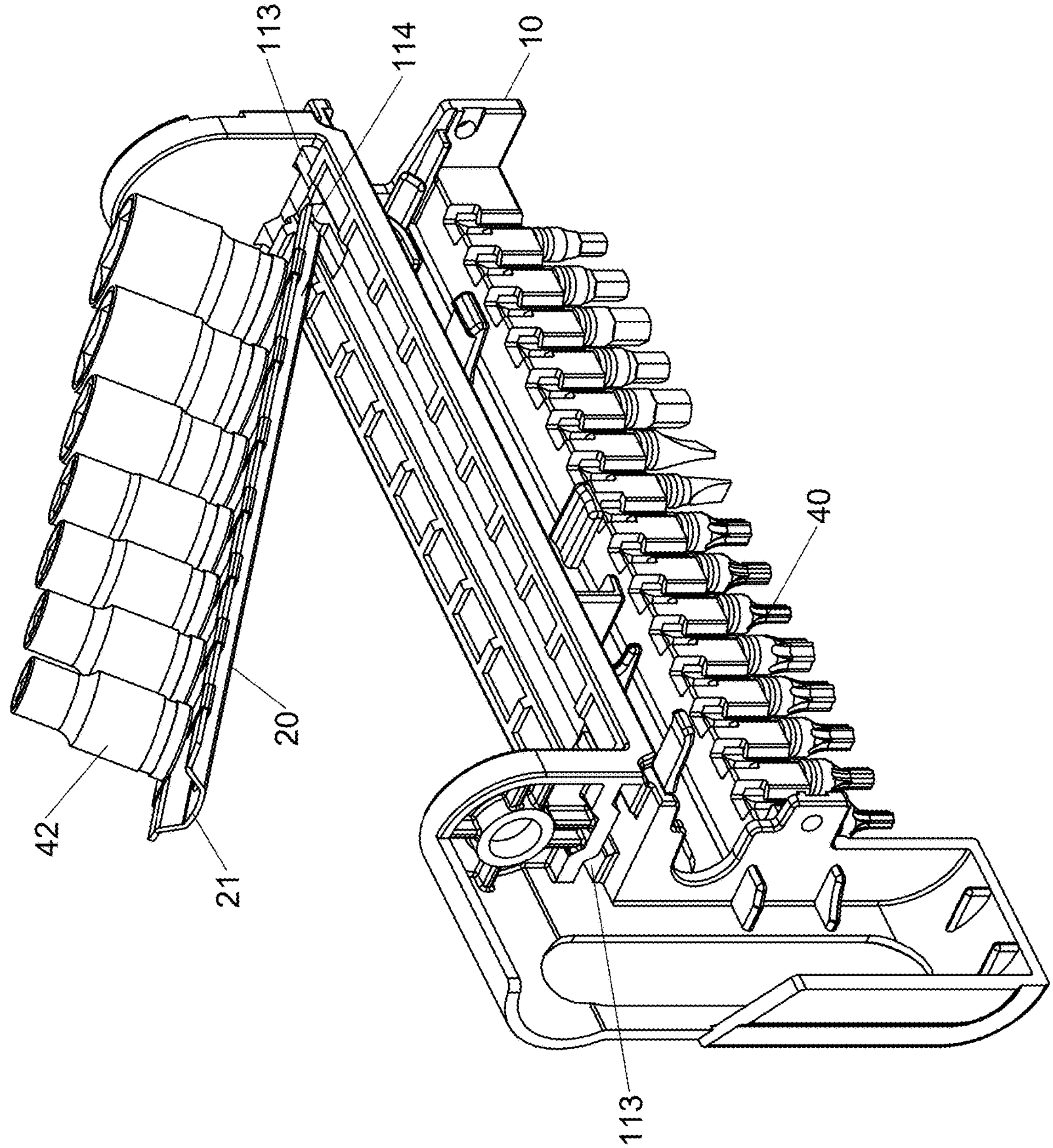
FIG. 5 is a first assembly view of the first body and the second body of the tool kit structure in accordance with preferred embodiment of the present invention.
Figure 6:
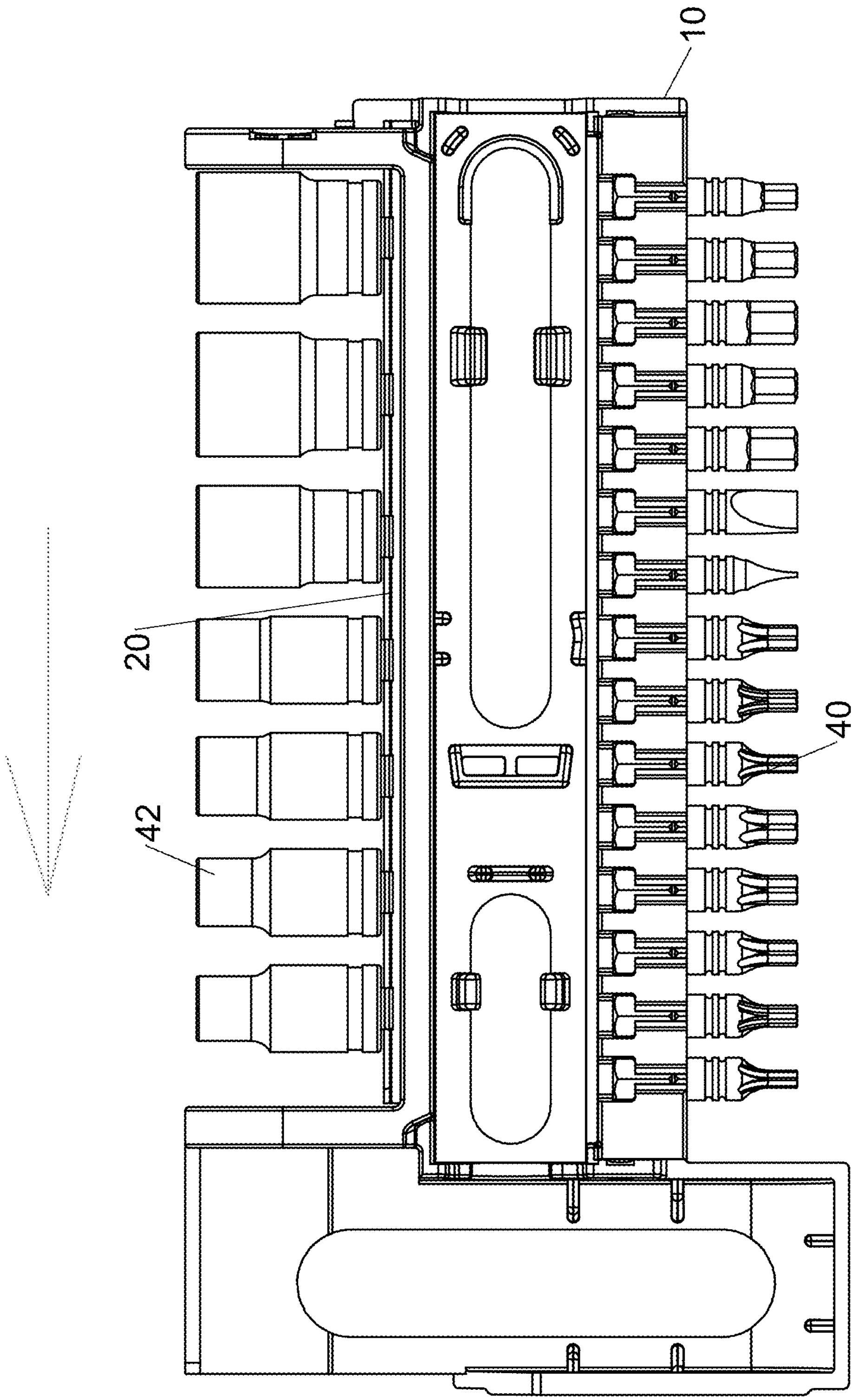
FIG. 6 is a second assembly view of the first body and the second body of the tool kit structure in accordance with preferred embodiment of the present invention.
Figure 7:
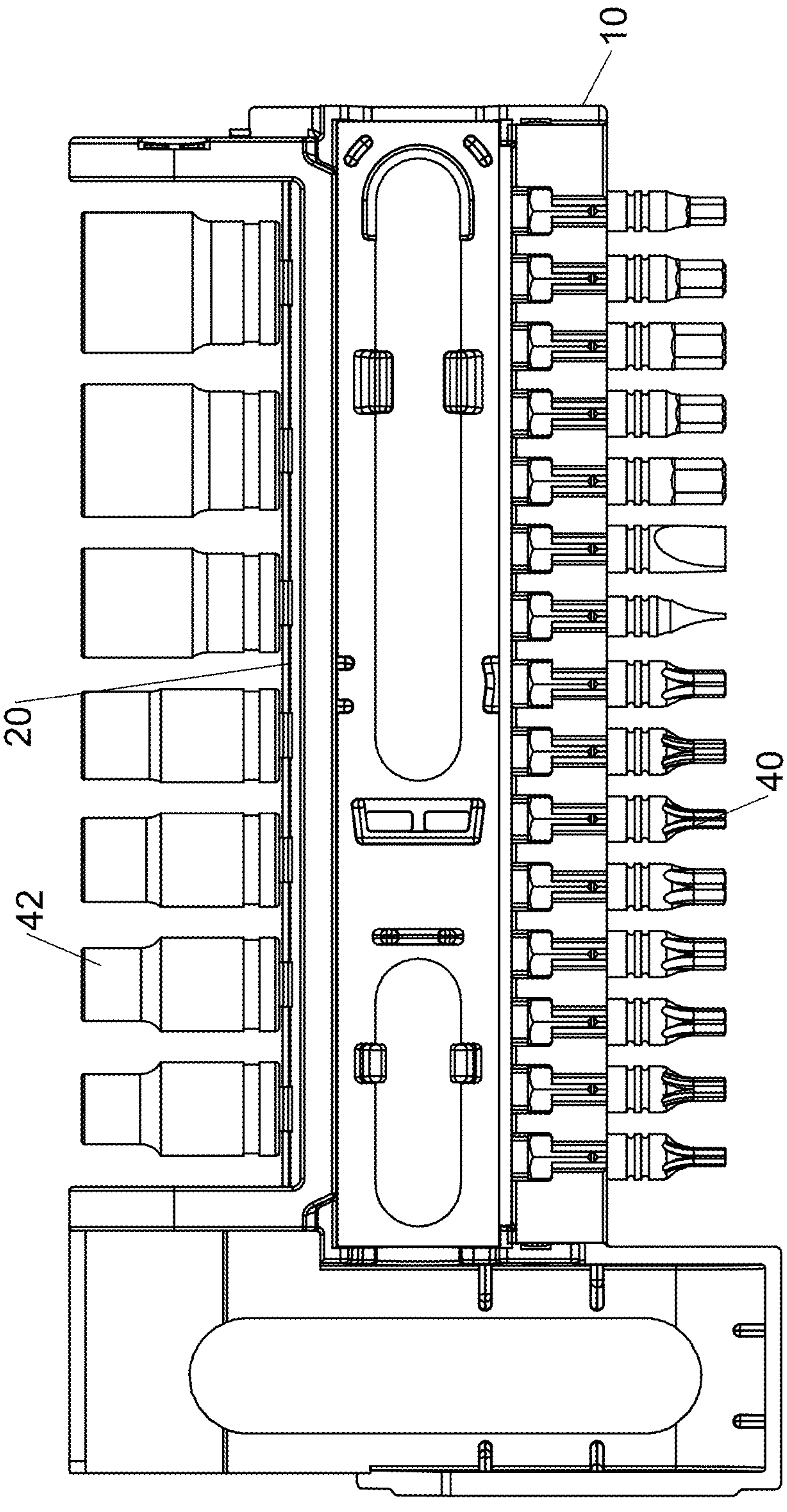
FIG. 7 is a third assembly view of the first body and the second body of the tool kit structure in accordance with preferred embodiment of the present invention.
Figure 8:
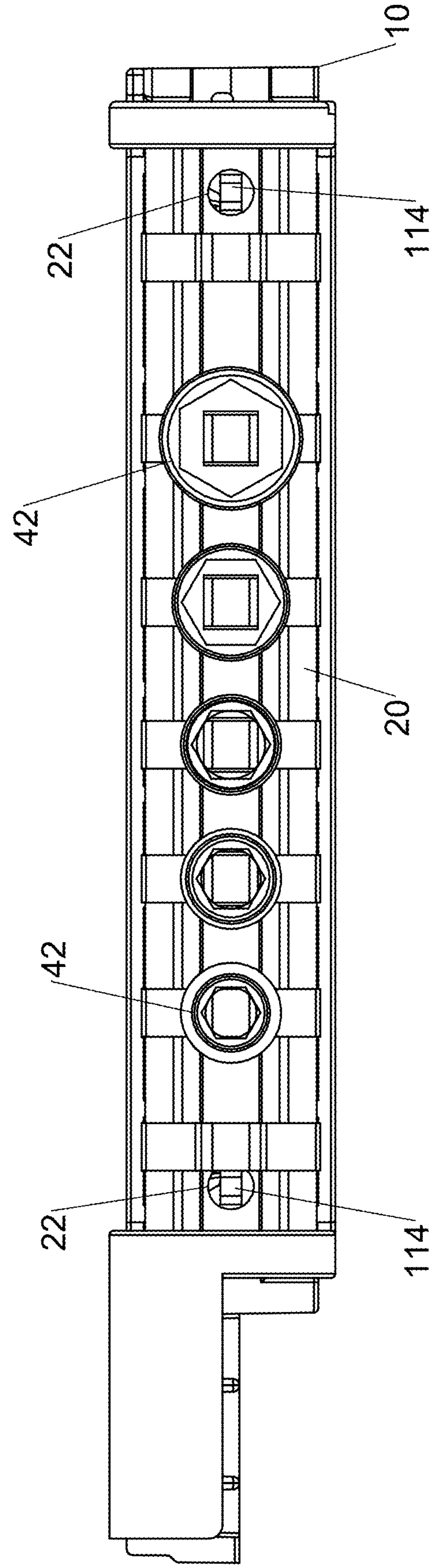
FIG. 8 shows a top view after the first body and the second body are assembled.
Figure 9:
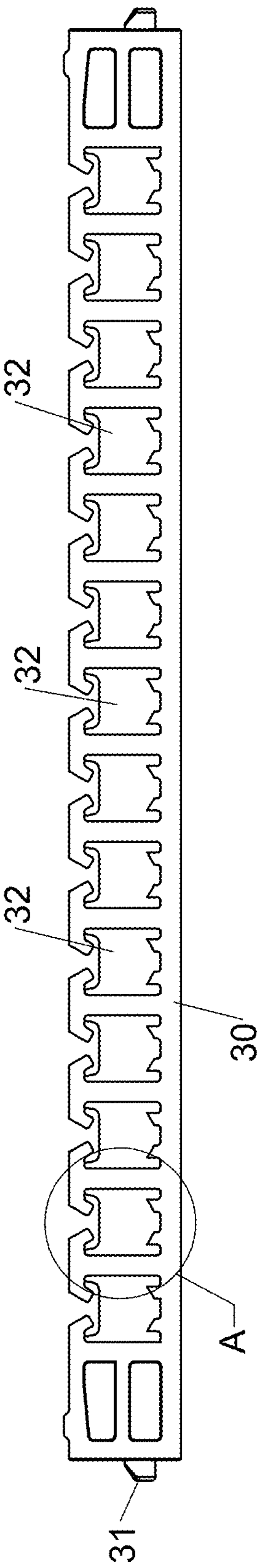
FIG. 9 is a side view of a third body of the tool kit structure in accordance with preferred embodiment of the present invention.
Figure 10:
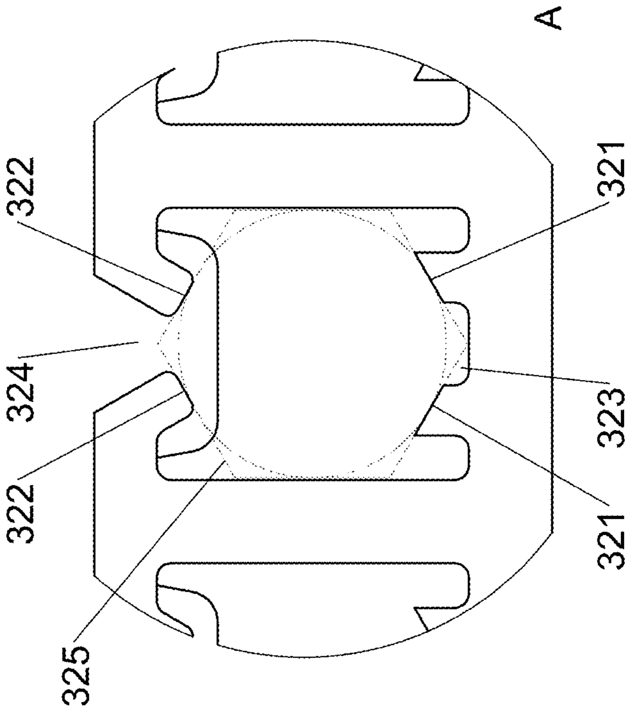
FIG. 10 is a locally enlarged view of the tool kit structure taken along circle A as shown in FIG. 9.
Figure 11:
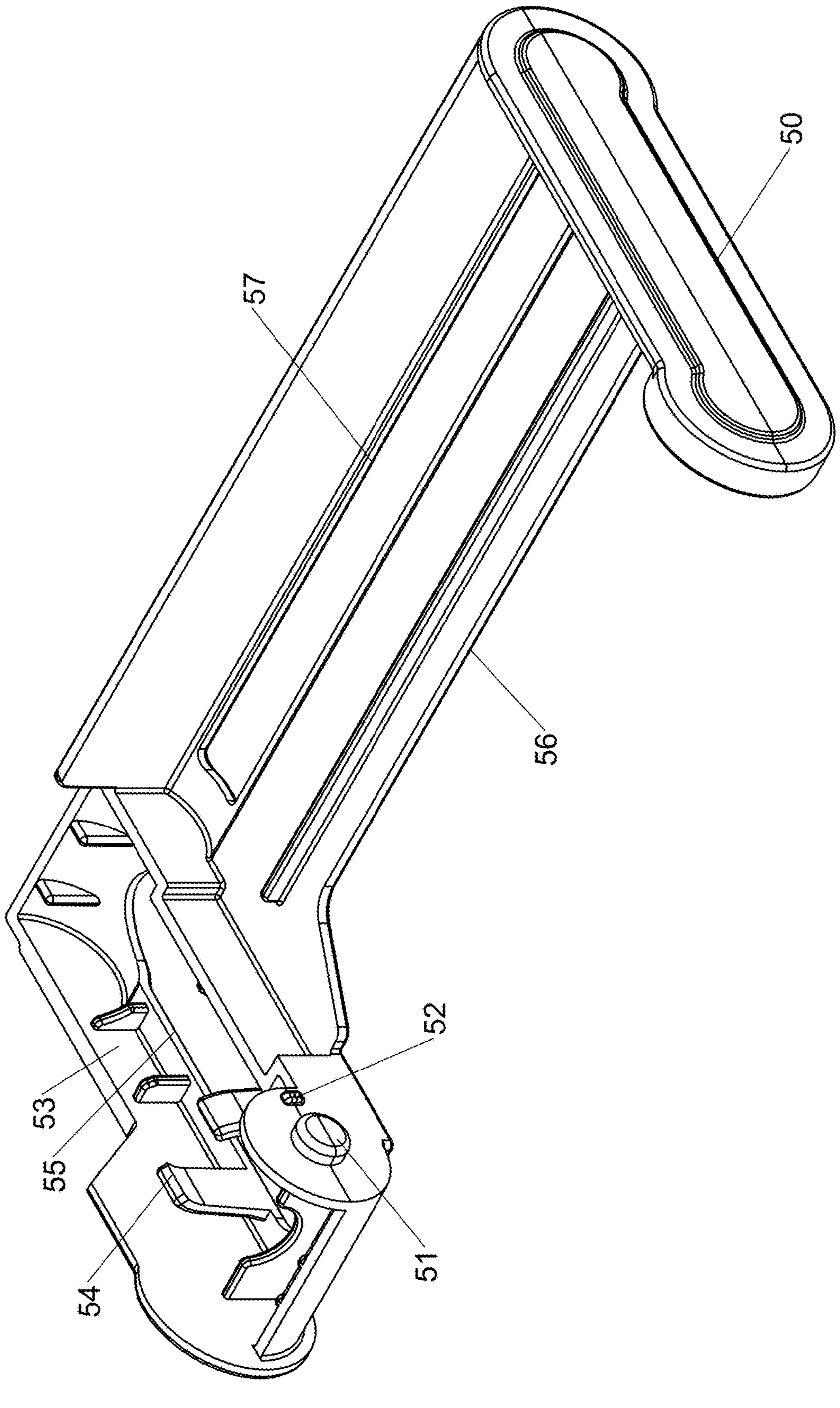
FIG. 11 is a perspective view of a third body of the tool kit structure in accordance with preferred embodiment of the present invention.

Especially referring to FIGS. 5-7, when the second body 20 is assembled in the first receiving recess 11, one end of the second body 20 is inclined relative to the first receiving recess 11, with one of the two receiving portions 21 extending into one of the two first grooves 113. Then, the second body 20 is placed flat in the first receiving recess 11, with the third face 23 abutting the first face 115, and with the fourth face 24 abutting the second face 116, so that the second body 20 presses the two second locking sections 114. When the second body 20 is pushed leftward, the other one of the two receiving portions 21 of the second body 20 extends into the other one of the two first grooves 113, so that the two receiving portions 21 are received in the two first grooves 113 respectively. When the two fourth locking sections 22 are moved to align with the two second locking sections 114 respectively, the two fourth locking sections 22 are restored elastically, so that the two fourth locking sections 22 are locked on the two second locking sections 114 respectively. Thus, the first body 10 and the second body 20 are assembled as shown in FIG. 8.

Preferably, each of the fifth locking sections 25 is a single part. The fifth locking sections 25 are assembled on the second body 20. The fifth locking sections 25 may be slidable on the second body 20 individually.

The third body 30 is an elongate block. The third body 30 is assembled in the second receiving recess 12. The third body 30 rests on a side of the third receiving recesses 13. The third body 30 has two third pivot portions 31 formed on two ends thereof. The two third pivot portions 31 are pivotally connected with the two second pivot portions 121 respectively, so that the third body 30 is rotatable slightly in the second receiving recess 12 through an angle. The third body 30 is rotatable to rest on the first abutting portion 122 of each of the two second pivot portions 121, to restrict a maximum angle of rotation of the third body 30.

The third body 30 is provided with multiple mounting portions 32 arranged linearly. Each of the mounting portions 32 is provided with two fifth faces 321 and two sixth faces 322. The two fifth faces 321 are opposite to the two sixth faces 322. The two fifth faces 321 are adjacent to each other. An angle of one hundred and twenty degrees (120°) is defined between the two fifth faces 321. The two sixth faces 322 are adjacent to each other. An angle of one hundred and twenty degrees (120°) is defined between the two sixth faces 322. Each of the two fifth faces 321 is spaced from each of the two sixth faces 322. A first space 323 is defined between the two fifth faces 321 and has a structural elasticity. A second space 324 is defined between the two sixth faces 322 and forms a gap having a structural elasticity. Each of the mounting portions 32 has an interior provided with a hexagon 325 having six surfaces. The two fifth faces 321 and the two sixth faces 322 construct (or coincide with) four of the six surfaces of the hexagon 325. Thus, each of the mounting portions 32 may receive or accommodate a tool having a hexagonal cross-section.

Each of the third receiving recesses 13 has a structure the same as that of each of the mounting portions 32. The third receiving recesses 13 have a number the same as that of the mounting portions 32. The third receiving recesses 13 are arranged linearly.

The first tools 40 are received or accommodated in the third receiving recesses 13 respectively. Preferably, each of the first tools 40 is a screwdriver tip.

The second tools 41 are received in the fourth receiving recess 14 and locked on the third locking sections 141 respectively. Preferably, one of the second tools 41 is a ratchet wrench, and another one of the second tools 41 is a screwdriver tip.

The third tools 42 are mounted on the fifth locking sections 25 respectively. Each of the third tools 42 is a socket. Preferably, the third tools 42 have different sizes.

The fourth tools 43 are received or accommodated in the mounting portions 32 respectively. Preferably, each of the fourth tools 43 is a screwdriver tip.

Figure 12:
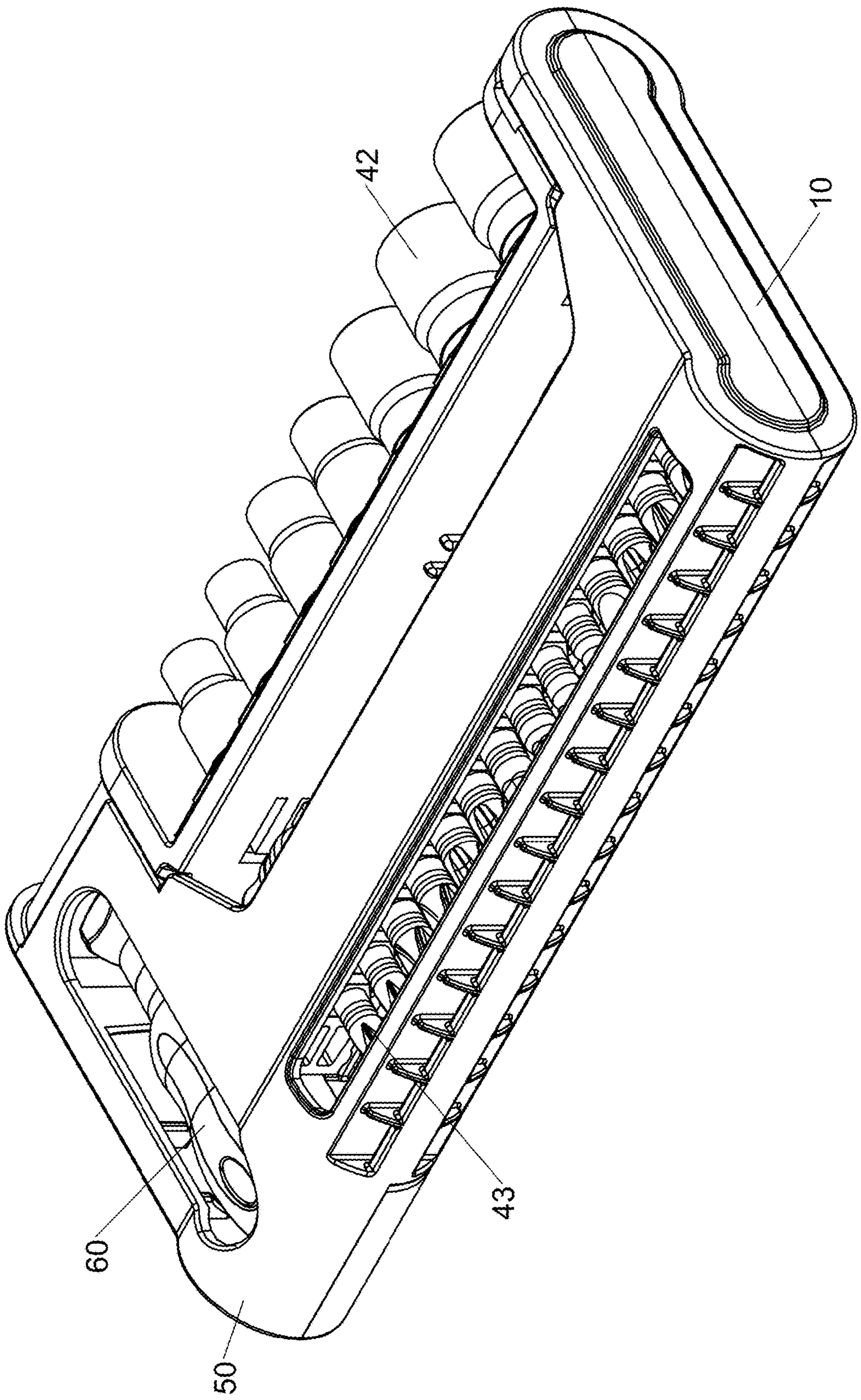
FIG. 12 is a perspective assembly view of the tool kit structure in accordance with preferred embodiment of the present invention.
Figure 14:
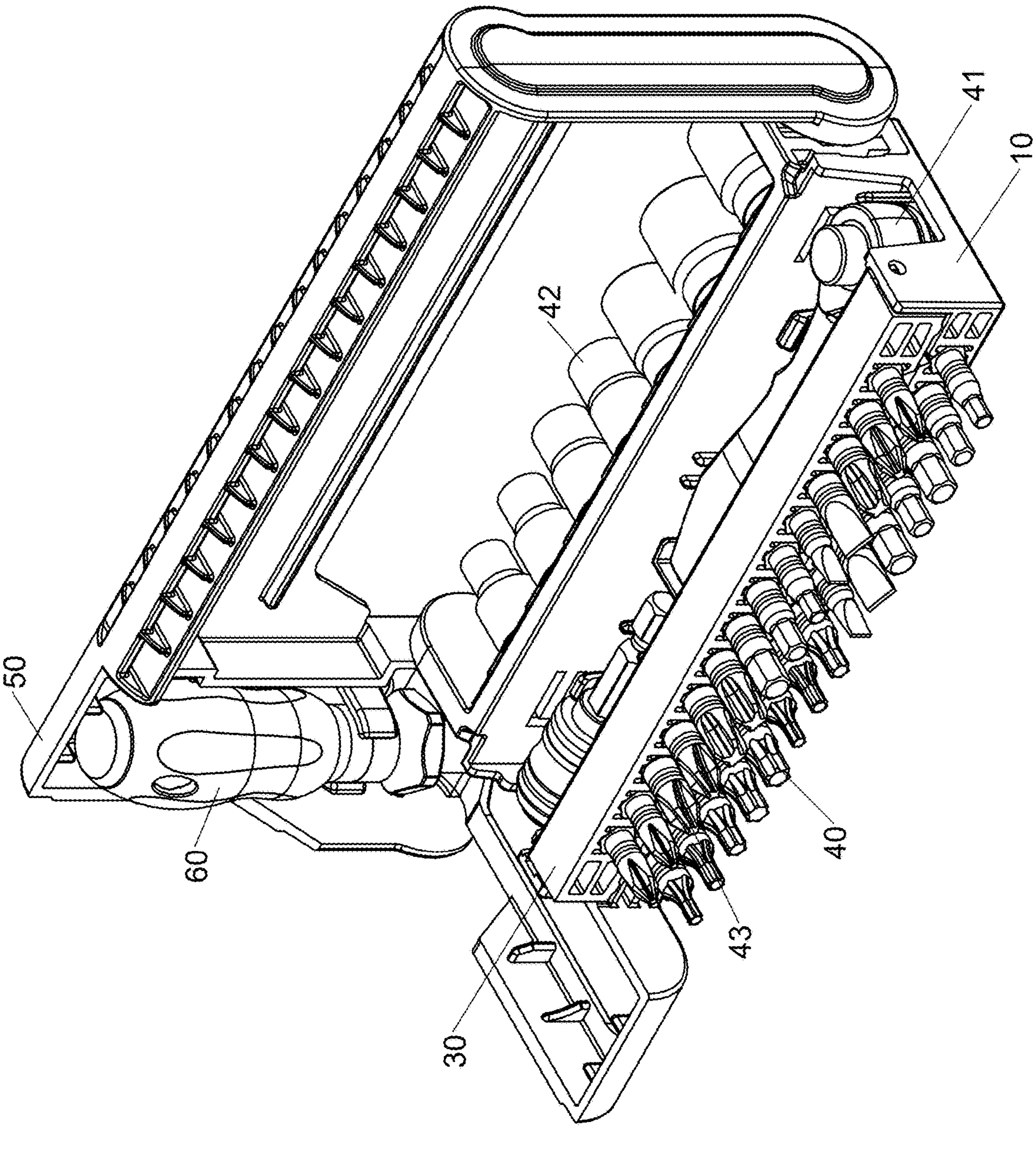
FIG. 14 is a perspective view showing a first operational state of the tool kit structure in accordance with preferred embodiment of the present invention.

The fourth body 50 is provided with two fourth pivot portions 51 pivotally connected with the two first pivot portions 111, so that the fourth body 50 is pivotally connected with the first body 10. Thus, the fourth body 50 covers the first body 10 as shown in FIG. 12 or extends from the first body 10 as shown in FIG. 14. Preferably, the fourth body 50 is rotatable relative to the first body 10 through an angle. Each of the two fourth pivot portions 51 is provided with a sixth locking section 52. Thus, the sixth locking section 52 of each of the two fourth pivot portions 51 is locked on the first locking section 112 of each of the two first pivot portions 111 when the fourth body 50 covers or extends from the first body 10, so that the fourth body 50 is positioned relative to the first body 10. Preferably, the sixth locking section 52 of one of the two fourth pivot portions 51 is a projection, and the sixth locking section 52 of the other one of the two fourth pivot portions 51 is a cavity. The fourth body 50 has an end provided with a sixth receiving recess 53 aligning with the fifth receiving recess 15. The sixth receiving recess 53 is provided with at least one seventh locking section 54. Preferably, the at least one seventh locking section 54 includes two clamping blocks. The sixth receiving recess 53 is provided with a third hollow slot 55. The fourth body 50 is provided with a fourth hollow slot 56 located between the two fourth pivot portions 51. The fourth body 50 is provided with a fifth hollow slot 57 located beside the fourth hollow slot 56.

The fifth tool 60 is a handle. The fifth tool 60 is received or accommodated between the fifth receiving recess 15 and the sixth receiving recess 53. The fifth tool 60 is locked on the at least one seventh locking section 54.

Figure 13:
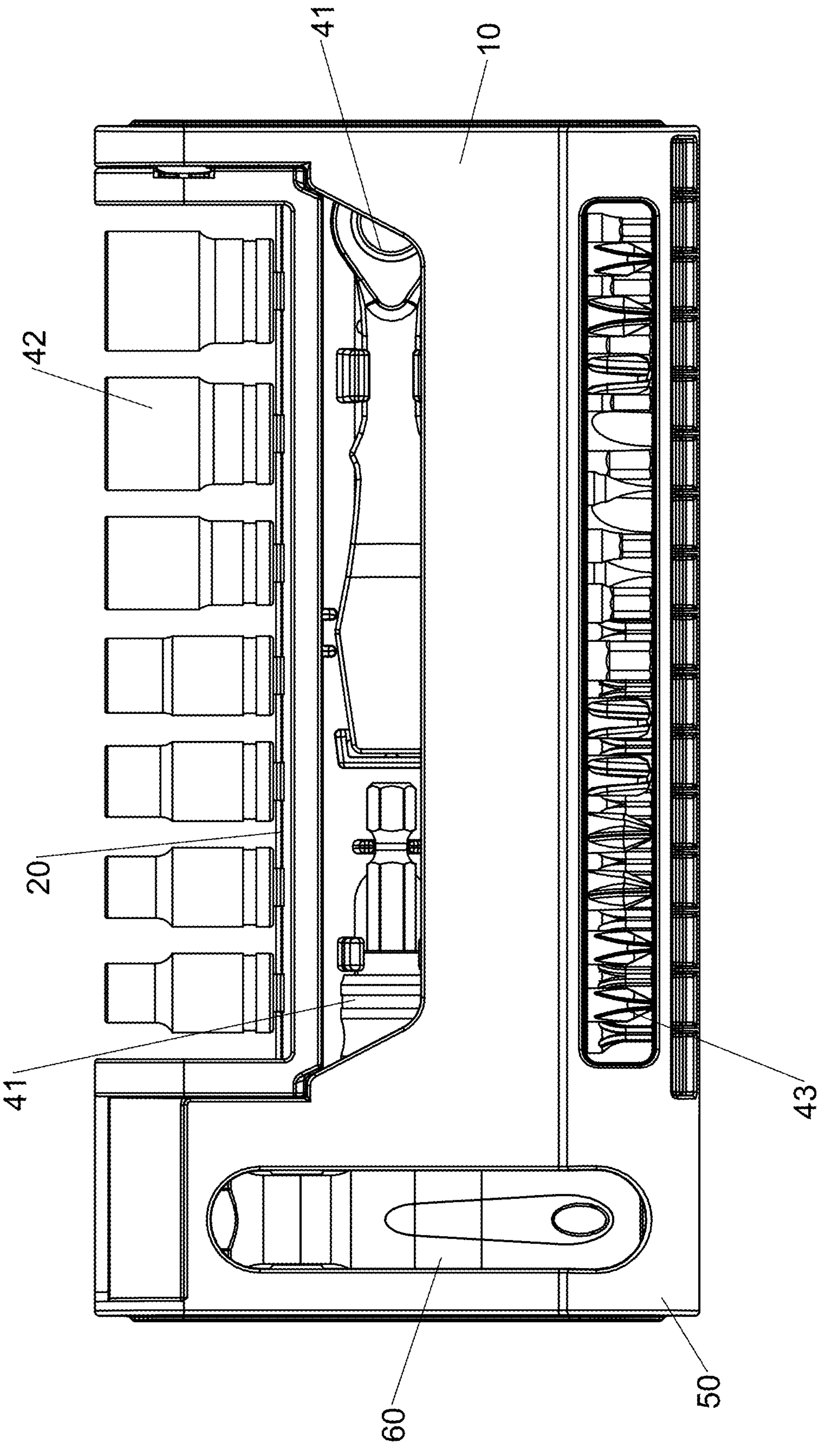
FIG. 13 is a side view of the tool kit structure as shown in FIG. 12.

Referring to FIGS. 12 and 13 with reference to FIGS. 1-11, when the fourth body 50 covers the first body 10, it can be seen from the at least one first hollow slot 142 that the second tools 41 are received in the fourth receiving recess 14, it can be seen from the second hollow slot 151 and the third hollow slot 55 that the fifth tool 60 is received in the fifth receiving recess 15 and the sixth receiving recess 53, it can be seen from the fourth hollow slot 56 that the third tools 42 are received in the first receiving recess 11 and locked on the fifth locking sections 25 respectively, and two of the second tools 41 are received in the fourth receiving recess 14, and it can be seen from the fifth hollow slot 57 that the fourth tools 43 are received in the mounting portions 32 respectively, and the first tools 40 are received in the third receiving recesses 13 respectively.

Figure 15:
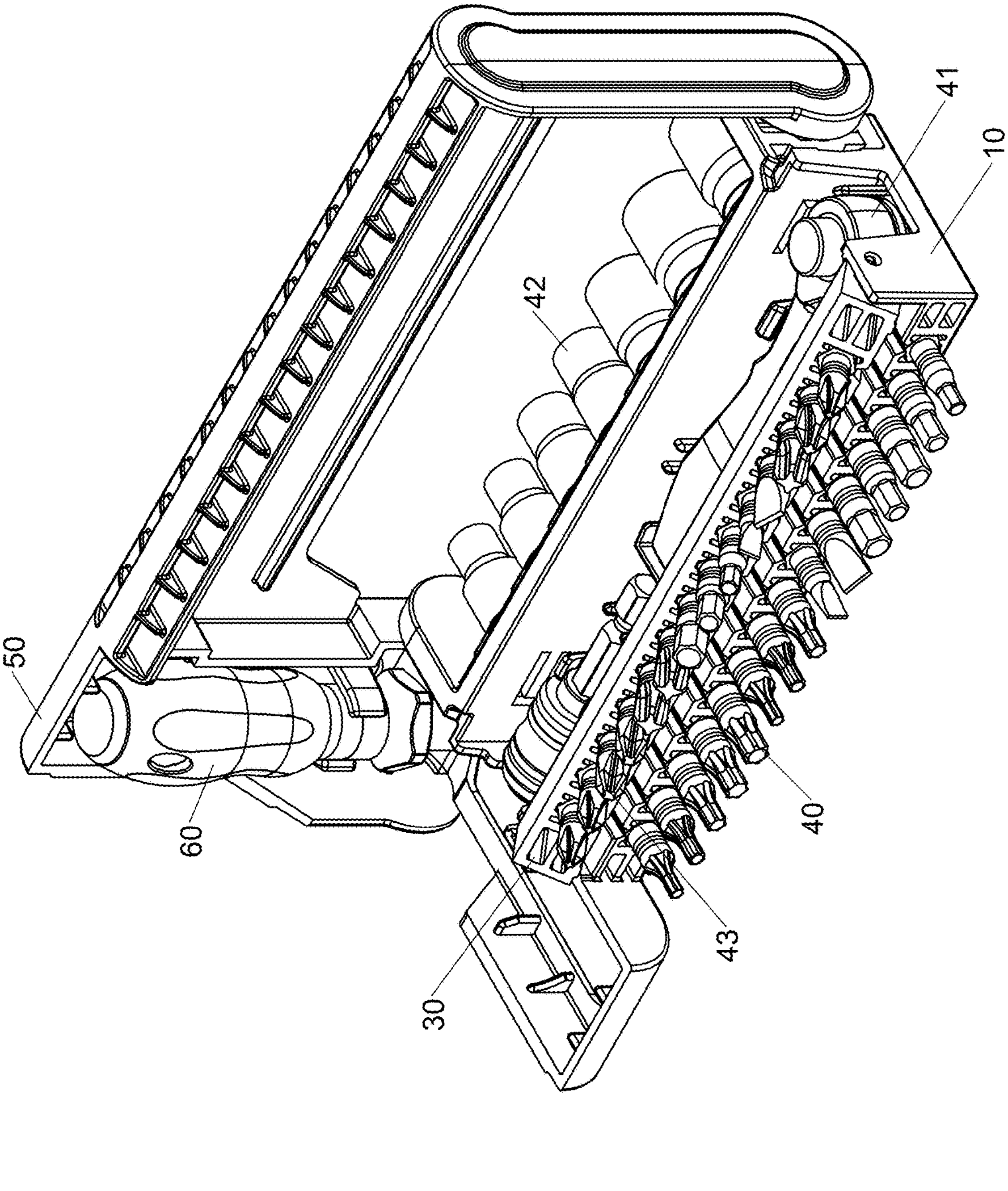
FIG. 15 is a perspective view showing a second operational state of the tool kit structure in accordance with preferred embodiment of the present invention.

Referring to FIGS. 14 and 15 with reference to FIGS. 1-13, the two fourth pivot portions 51 are pivoted relative to the two first pivot portions 111 respectively, so that the fourth body 50 is rotatable relative to the first body 10 through an angle. Thus, the first body 10 extends from the first body 10 so that the tool kit structure is opened as shown in FIG. 14. Then, the two third pivot portions 31 are pivoted relative to the two second pivot portions 121 respectively, so that the third body 30 is rotatable relative to the first body 10 through an angle as shown in FIG. 15. Thus, the third body 30 is inclined relative to first body 10 to facilitate the user removing the fourth tools 43 from the mounting portions 32 or removing the first tools 40 from the third receiving recesses 13.

Figure 16:
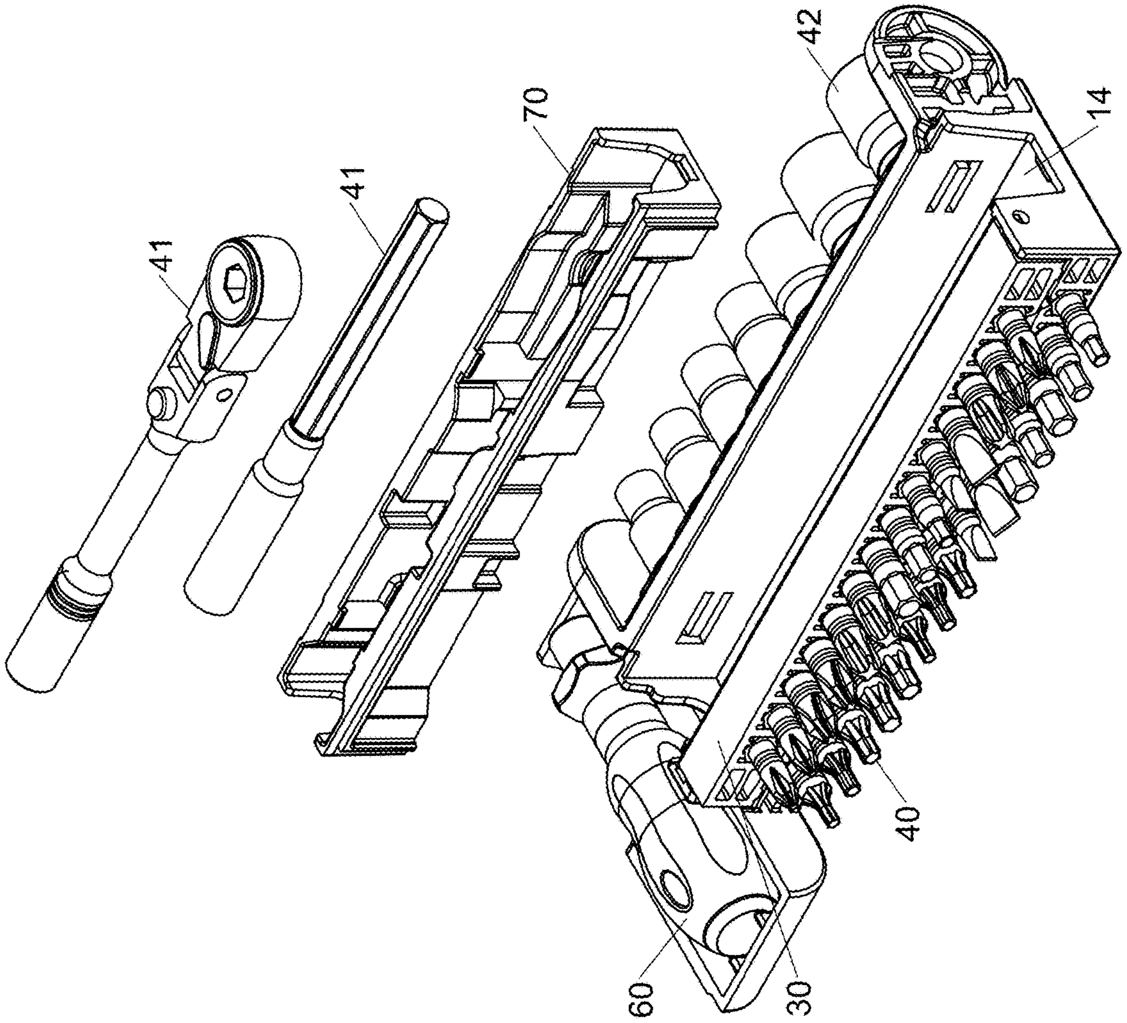
FIG. 16 is a perspective view of a tool kit structure in accordance with the second preferred embodiment of the present invention.

Referring to FIG. 16, the tool kit structure further comprises a receiving box 70 assembled or secured in the fourth receiving recess 14, and the second tools 41 are mounted in the receiving box 70.

Accordingly, the tool kit structure of the present invention has the following advantages.

1. When the fourth body 50 covers the first body 10, it can be seen from the at least one first hollow slot 142 that the second tools 41 are received in the fourth receiving recess 14, it can be seen from the second hollow slot 151 and the third hollow slot 55 that the fifth tool 60 is received in the fifth receiving recess 15 and the sixth receiving recess 53, it can be seen from the fourth hollow slot 56 that the third tools 42 are received in the first receiving recess 11, and two of the second tools 41 are received in the fourth receiving recess 14, and it can be seen from the fifth hollow slot 57 that the fourth tools 43 are received in the mounting portions 32 respectively, and the first tools 40 are received in the third receiving recesses 13 respectively. Thus, the tool kit structure is provided with the at least one first hollow slot 142, the second hollow slot 151, the third hollow slot 55, the fourth hollow slot 56, and the fifth hollow slot 57, to facilitate the user viewing and checking the inside of the tool kit structure, and to facilitate the user taking the tools.
2. The tool kit structure is provided with the at least one first hollow slot 142, the second hollow slot 151, the third hollow slot 55, the fourth hollow slot 56, and the fifth hollow slot 57, so that the first tools 40, the second tools 41, the third tools 42, and the fourth tools 43 can be seen clearly from two sides of the tool kit structure, to facilitate the user viewing and taking the tools.

3. The fourth body 50 is pivotally connected with the first body 10, so that the first tools 40, the second tools 41, the third tools 42, and the fourth tools 43 are protected exactly without detachment. In addition, the first body 10 is provided with the at least one first hollow slot 142 and the second hollow slot 151 to provide a viewing effect, and the fourth body 50 is provided with the third hollow slot 55, the fourth hollow slot 56, and the fifth hollow slot 57 to provide a viewing effect, so that the first body 10 and the fourth body 50 have a double function.
4. The two receiving portions 21 are received in the two first grooves 113 respectively, and the two fourth locking sections 22 are locked on the two second locking sections 114 respectively, so that the second body 20 will not be moved in the first receiving recess 11 leftward or rightward. In addition, the third face 23 is flush with or rests on the first face 115, and the fourth face 24 is flush with or rests on the second face 116, so that the second body 20 will not be moved in the first receiving recess 11 forward or backward. Thus, the second body 20 is positioned in the first receiving recess 11 in four directions, so that the second body 20 is exactly assembled in the first receiving recess 11.
5. It is necessary to press the two second locking sections 114 simultaneously to remove the second body 20 and the third tools 42, so that the second body 20 will not be detached from the first receiving recess 11 easily.
6. After the second body 20 and the third tools 42 are removed from the first receiving recess 11, the second body 20 and the third tools 42 are used individually, to enhance the utility of the tool kit structure.
7. The third locking sections 141 are arranged on the at least one first hollow slot 142 for locking the second tools 41, and the at least one seventh locking section 54 is arranged on the third hollow slot 55 for locking the fifth tool 60, so that the second tools 41 and the fifth tool 60 are stored and locked exactly.
8. The sixth locking section 52 of each of the two fourth pivot portions 51 is locked on the first locking section 112 of each of the two first pivot portions 111 when the fourth body 50 covers or extends from the first body 10, so that the fourth body 50 is positioned and limited relative to the first body 10 when the fourth body 50 covers or extends from the first body 10.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A tool kit structure comprising:

a first body, a second body, a third body, and a fourth body;

wherein:

the first body is provided with a first receiving recess having two open sides;

the first receiving recess has two first pivot portions formed on two ends thereof;

each of the two first pivot portions is provided with a first locking section;

the first receiving recess has two first grooves formed in the two ends thereof;

the first receiving recess is provided with two second locking sections;

each of the two second locking sections is an elastic projection or bump;

each of the two second locking sections is elastic and may be pressed downward;

the two second locking sections are located at the two ends of the first receiving recess;

the first receiving recess is provided with a first face and a second face;

the second face divides the first face into two parts;

the second face and the first face are on different planes;

the second face has a height less than that of the first face;

the two second locking sections are located on the second face;

the first body is provided with a second receiving recess opposite to the first receiving recess;

the second receiving recess has two second pivot portions formed on two ends thereof;

each of the two second pivot portions has a side provided with a first abutting portion;

the first body is provided with multiple third receiving recesses located at a side of the second receiving recess;

the third receiving recesses are arranged linearly;

each of the third receiving recesses is a groove;

the first body is provided with a fourth receiving recess located between the first receiving recess and the second receiving recess;

the fourth receiving recess is provided with multiple third locking sections;

the fourth receiving recess is provided with at least one first hollow slot;

the first body has an end provided with a fifth receiving recess located at an end of the first receiving recess, the second receiving recess, and the fourth receiving recess;

the fifth receiving recess is provided with a second hollow slot;

the second body is mounted in the first receiving recess;

the second body has two receiving portions formed on two ends thereof;

the two receiving portions correspond to the two first grooves respectively;

the second body is provided with two fourth locking sections locked on the two second locking sections respectively;

each of the two fourth locking sections is a through hole;

the second body is provided with a third face and a fourth face;

the third face and the fourth face are on different planes;

the third face is flush with or rests on the first face;

the fourth face is flush with or rests on the second face;

the second body is provided with multiple fifth locking sections;

each of the fifth locking sections has two ends abutting the third face;

a U-shaped portion of each of the fifth locking sections aligns with the fourth face;

the fifth locking sections are arranged linearly;

the two receiving portions are received in the two first grooves respectively, and the two fourth locking sections are locked on the two second locking sections respectively, so that the second body is non-movable in the first receiving recess;

the third face is flush with or rests on the first face, and the fourth face is flush with or rests on the second face, so that the second body is non-movable in the first receiving recess;

the third body is an elongate block;

the third body is assembled in the second receiving recess;

the third body rests on a side of the third receiving recesses;

the third body has two third pivot portions formed on two ends thereof;

the two third pivot portions are pivotally connected with the two second pivot portions respectively, so that the third body is rotatable in the second receiving recess through an angle;

the third body is rotatable to rest on the first abutting portion of each of the two second pivot portions, to restrict a maximum angle of rotation of the third body;

the third body is provided with multiple mounting portions arranged linearly;

the fourth body is provided with two fourth pivot portions pivotally connected with the two first pivot portions, so that the fourth body is pivotally connected with the first body;

the fourth body covers the first body or extends from the first body;

the fourth body is rotatable relative to the first body through an angle;

each of the two fourth pivot portions is provided with a sixth locking section;

the sixth locking section of each of the two fourth pivot portions is locked on the first locking section of each of the two first pivot portions when the fourth body covers or extends from the first body, so that the fourth body is positioned relative to the first body;

the fourth body has an end provided with a sixth receiving recess aligning with the fifth receiving recess;

the sixth receiving recess is provided with at least one seventh locking section;

the sixth receiving recess is provided with a third hollow slot;

the fourth body is provided with a fourth hollow slot located between the two fourth pivot portions; and the fourth body is provided with a fifth hollow slot located beside the fourth hollow slot.

2. The tool kit structure as claimed in claim 1, wherein:

each of the two first pivot portions is a non-penetrating circular hole;

the first locking section of one of the two first pivot portions is a projection, and the first locking section of the other one of the two first pivot portions is a cavity; and the sixth locking section of one of the two fourth pivot portions is a projection, and the sixth locking section of the other one of the two fourth pivot portions is a cavity.

3. The tool kit structure as claimed in claim 1, wherein each of the two second pivot portions is a circular hole or groove, and the first abutting portion is a lug or flange.

4. The tool kit structure as claimed in claim 3, wherein each of the third locking sections includes two clamping blocks, and the at least one first hollow slot is located between the two clamping blocks of each of the third locking sections and has an elongate shape.

5. The tool kit structure as claimed in claim 3, wherein:

each of the fifth locking sections is a single part;

the fifth locking sections are assembled on the second body; and the fifth locking sections may be slidable on the second body individually.

6. The tool kit structure as claimed in claim 1, wherein:

each of the mounting portions is provided with two fifth faces and two sixth faces;

the two fifth faces are opposite to the two sixth faces;

the two fifth faces are adjacent to each other;

an angle of one hundred and twenty degrees is defined between the two fifth faces;

the two sixth faces are adjacent to each other;

an angle of one hundred and twenty degrees is defined between the two sixth faces;

each of the two fifth faces is spaced from each of the two sixth faces;

a first space is defined between the two fifth faces and has a structural elasticity; and a second space is defined between the two sixth faces and forms a gap having a structural elasticity.

7. The tool kit structure as claimed in claim 1, further comprising:

multiple first tools received in the third receiving recesses respectively, wherein each of the first tools is a screwdriver tip;

multiple second tools received in the fourth receiving recess and locked on the third locking sections respectively, wherein one of the second tools is a ratchet wrench, and another one of the second tools is a screwdriver tip;

multiple third tools mounted on the fifth locking sections respectively, wherein each of the third tools is a socket, and the third tools have different sizes; and multiple fourth tools received in the mounting portions respectively, wherein each of the fourth tools is a screwdriver tip.

8. The tool kit structure as claimed in claim 1, further comprising:

a fifth tool, wherein:

the fifth tool is a handle;

the fifth tool is received between the fifth receiving recess and the sixth receiving recess;

the fifth tool is locked on the at least one seventh locking section; and the at least one seventh locking section includes two clamping blocks.

9. The tool kit structure as claimed in claim 1, further comprising:

a receiving box assembled or secured in the fourth receiving recess, wherein the second tools are mounted in the receiving box.

* * * * *